United States Patent
Pfnuer et al.

(10) Patent No.: US 9,417,413 B2
(45) Date of Patent: Aug. 16, 2016

(54) COMPACT MULTIPLE CHANNEL OPTICAL RECEIVER ASSEMBLY PACKAGE

(71) Applicant: Cisco Technology, Inc., San Jose, CA (US)

(72) Inventors: Stefan Pfnuer, San Jose, CA (US);
Pangchen Sun, San Diego, CA (US);
Matt Traverso, San Jose, CA (US);
Ravinder Kachru, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 138 days.

(21) Appl. No.: 14/255,107

(22) Filed: Apr. 17, 2014

(65) Prior Publication Data

US 2015/0304053 A1    Oct. 22, 2015

(51) Int. Cl.
*G02B 6/42* (2006.01)
*H04B 10/25* (2013.01)

(52) U.S. Cl.
CPC .............. *G02B 6/428* (2013.01); *G02B 6/4214* (2013.01); *G02B 6/4215* (2013.01); *G02B 6/4248* (2013.01); *G02B 6/4257* (2013.01); *H04B 10/2504* (2013.01)

(58) Field of Classification Search
CPC ..................................................... G02B 6/4215
See application file for complete search history.

(56) References Cited

U.S. PATENT DOCUMENTS

| | | | | |
|---|---|---|---|---|
| 2003/0095388 A1* | 5/2003 | Jiao | .................. | H05K 3/0061 361/749 |
| 2006/0088255 A1* | 4/2006 | Wu | .................. | G02B 6/2938 385/92 |
| 2010/0303463 A1 | 12/2010 | Bernasconi | | |
| 2012/0012738 A1* | 1/2012 | Shinada | .................. | G02B 6/26 250/226 |
| 2012/0087678 A1 | 4/2012 | Earnshaw | | |
| 2013/0188970 A1 | 7/2013 | Shastri et al. | | |
| 2013/0314707 A1 | 11/2013 | Shastri et al. | | |
| 2015/0016772 A1 | 1/2015 | Arao et al. | | |
| 2015/0153524 A1* | 6/2015 | Chen | .................. | H01L 25/50 385/14 |

FOREIGN PATENT DOCUMENTS

| | | |
|---|---|---|
| CN | 103635844 A | 3/2014 |
| EP | 0978740 B1 | 2/2000 |
| WO | 2004017428 A1 | 2/2004 |
| WO | 2012097979 A1 | 7/2012 |

OTHER PUBLICATIONS

English translation of Office Action and Search Report in counterpart Chinese Patent Application No. 201510181289.6, mailed May 3, 2016, 12 pages.

* cited by examiner

*Primary Examiner* — Nathan Curs
(74) *Attorney, Agent, or Firm* — Edell, Shapiro & Finnan, LLC

(57) ABSTRACT

An optical assembly package is provided for the optical receive components of an optical transceiver. The optical assembly package includes a receptacle subassembly configured to receive an end of an optical fiber. A housing is provided having an opening at one end configured to receive the receptacle assembly. Optical routing and wavelength demultiplexing elements are mounted to a bottom wall of the housing. An electrical subassembly comprising a support plate, a circuit board mounted on the support plate, an integrated circuit mounted to the circuit board, and a plurality of photodetectors mounted to the support plate proximate an edge of the circuit board. The electrical subassembly is positioned a stacked arrangement beneath the housing to minimize an overall length of the optical assembly package.

20 Claims, 11 Drawing Sheets

COMPACT MULTIPLE CHANNEL OPTICAL RECEIVER ASSEMBLY PACKAGE

TECHNICAL FIELD

The present disclosure relates to optical receiver subassemblies.

BACKGROUND

In optical networks, devices are needed at an optical node for converting wavelength multiplexed and modulated light into an electrical signal. An example is the 100 Gbps Long Reach 4 (LR4) light beam that consists of 4 wavelengths separated by 800 GHz traveling in a single fiber. Each wavelength signal is modulated at 25 Gbps. The received optical signal is first demultiplexed into the individual wavelengths and then converted to an electrical signal using photodiodes. In long haul and metropolitan networks, a similar wavelength multiplexed scheme is used to transport signals over long reaches using single mode fiber.

DESCRIPTION OF EXAMPLE EMBODIMENTS

Overview

In accordance with one embodiment, an optical receiver assembly package is provided for the optical receiver components of an optical transceiver. The optical receiver assembly package includes a receptacle subassembly configured to receive an end of an optical fiber. A housing is provided having an opening at one end configured to receive the receptacle assembly. Optical routing and wavelength demultiplexing elements are mounted to a bottom wall of the housing. An electrical subassembly is provided comprising a support plate, a circuit board mounted on the support plate, an integrated circuit mounted to the circuit board, and a plurality of photodetectors mounted to the support plate proximate an edge of the circuit board or on top of the circuit board. The electrical subassembly is positioned in a stacked arrangement beneath the housing to minimize an overall length of the optical assembly package.

Example Embodiments

With progress towards cheaper and more compact optical transceiver solutions, new modulation schemes are emerging which are electrically more complex but optically less complex/expensive (fewer multiplexed optical channels, as few as 1 or 2 channels). Also, end users are willing to accept non-hermetic optical assembly packages.

In accordance with the various embodiments presented herein, an optical receiver assembly packaging configuration is provided for the receive-side functions of an optical node in any of a variety of form factors, such as QSFP+ and QSFP28 or even SFP. These packaging configurations are useful for an optically "relaxed" but electrically challenging advanced modulation scheme. Optically "relaxed" means only one or two (or four) different wavelengths enter the receiver portion of the package. This eases the optical routing requirements. However, the electrical path is very unforgiving and involves very high signal integrity, short distance between photodetectors and integrated circuits (e.g., less than 1 mm), large integrated circuits with multiple built in functions (transmit impedance amplifiers, analog-to-digital converters, decoders, etc.) that require sufficient space in the receive package.

Accordingly, an optical receiver assembly package is provided that includes a first functional layer, a second functional layer and a third functional layer. The second functional layer is arranged between the first functional layer and the third functional layer, thereby forming a stacked or three-dimensional (3D) structure. This stacked structure allows for a reduction in the overall size of the optical assembly package.

Figure 1:
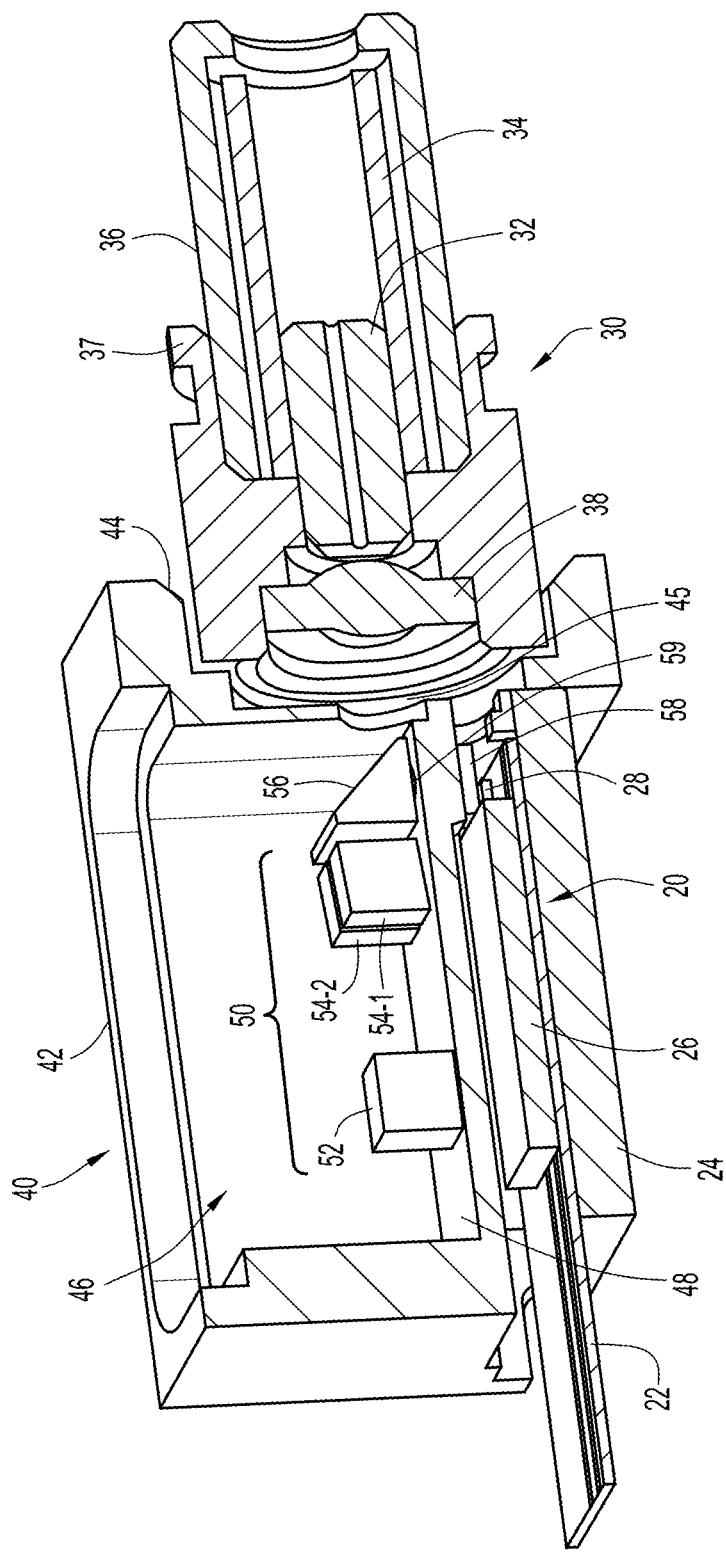
FIG. 1 is an internal perspective view of an optical receiver assembly package according to an example embodiment.
Figure 2:
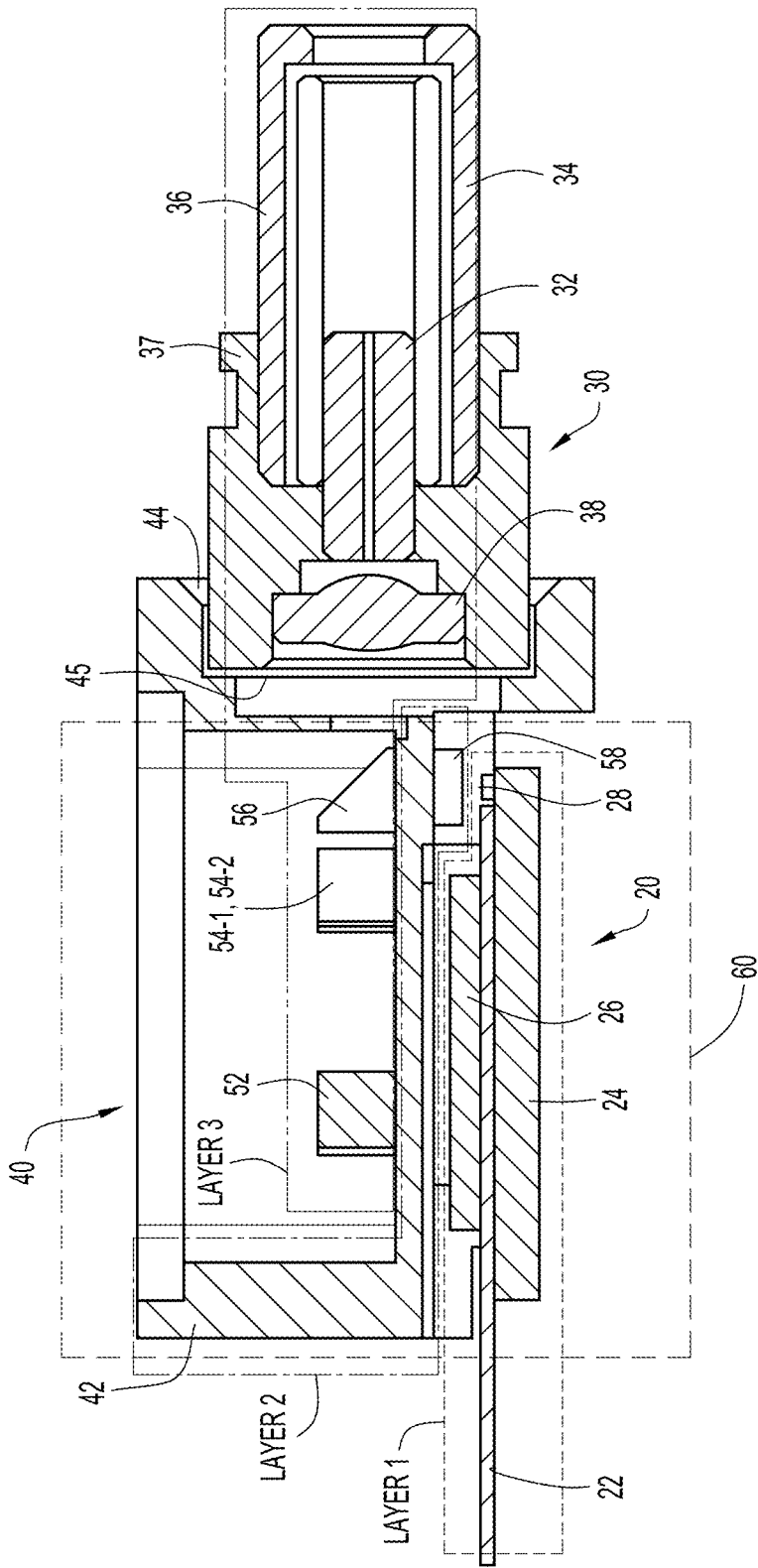
FIG. 2 is sectional view of the optical receiver assembly package shown in FIG. 1, according to an example embodiment.

Reference is made first to FIGS. 1 and 2. The optical assembly package is shown generally at reference numeral 10. The optical assembly package 10 comprises an electrical subassembly 20, a receptacle subassembly 30 and a housing 40. The electrical subassembly 20 includes a circuit board 22 mounted on a support plate 24, one or more electrical integrated circuits (ICs) 26 mounted on the circuit board 22, and one or more photodetectors (e.g., photodiodes) 28.

The receptacle subassembly 30 includes a fiber stub 32, a split sleeve 34, a metal sleeve 36 and a collimating lens 38. The metal sleeve 36 is elongated and the split sleeve 34 fits inside the metal sleeve 36. One end of the metal sleeve 36 fits inside a collar element 37. The fiber stub 32 is received and fits inside split sleeve 34 just short of the collimating lens 38. The receptacle subassembly 30 may be configured to be compliant with any of several standards, such as for example, QSFP+, QSFP28 and SFP.

The housing 40 includes a body 42 having a mouth or opening 44 into which the receptacle subassembly 30 is fitted. There is an opening 45 that allows light to pass from the receptacle assembly 30 into the housing 40. In the housing 40 is a hollow space 46 within which light beams are directed along specific paths. Side walls of hollow space 46 are not mandatory and could be partially or completely removed.

To this end, mounted on a bottom wall 48 of housing 40 are optical routing and wavelength demultiplexing elements shown collectively at reference numeral 50. The optical elements 50 include a mirror 52, thin film wavelength filters 54-1 and 54-2 and prism mirror 56. In addition, there is mounted to the underside of the bottom wall 48 a condensing lens array 58 over an opening 59 in the housing that directs received light downward to the electrical subassembly 20.

The optical assembly package 10 has multiple functional layers. As best depicted in FIG. 2, the electrical subassembly 20 forms a first functional layer, denoted Layer 1. Layer 1 includes active components, e.g., the electrical IC 26 and photodetectors 28, and the underlying supporting structure, i.e., circuit board 22 and support plate 24. Layer 1 may also be referred to as a bottom layer. Overlying Layer 1 is a second functional layer, denoted Layer 2. Layer 2 includes the supporting structures of the housing body 42 and the bottom wall 48 of the housing, along with the condensing lens array 58 that provides an optical feed-through to the photodetectors 28 in the electrical subassembly 20 of Layer 1. Layer 2 may also be referred to as a middle layer. Finally, on top of Layer 2 is a third functional layer or top layer, denoted Layer 3. Layer 3 includes the optical routing and wavelength demultiplexing elements 50 mounted inside housing 20 as well as the beam collimation lens 38 and related structures of the receptacle subassembly 30. Optical Layer 3 could also be preassembled outside optical package assembly 10 on a suitable additional carrier/plate, as described further hereinafter in connection with FIGS. 8A and 8B. In this way, the optical demultiplexing elements would not be placed directly on bottom wall 48 but preassembled and tested first before joined with Layer 1 and Layer 2. Also, certain components could also be shifted to other functional layers. For example, condensing lens (array) 58 could be moved from Layer 2 to Layer 1, and lens 38 and the receptacle subassembly 30 could be moved from Layer 3 to Layer 2.

Layers 1, 2 and 3 are stacked on each other and form a 3D arrangement, and in so doing, minimizing the overall size of the optical assembly package 10. The stacked/3D arrangement is depicted by the dotted box 60. The Layer 2 and Layer 3 components within the housing and mounted to the bottom wall 48 of the housing 40 overly the Layer 1 components. Moreover, the active and passive components are separated from each other within and across the functional layers.

Figure 3:
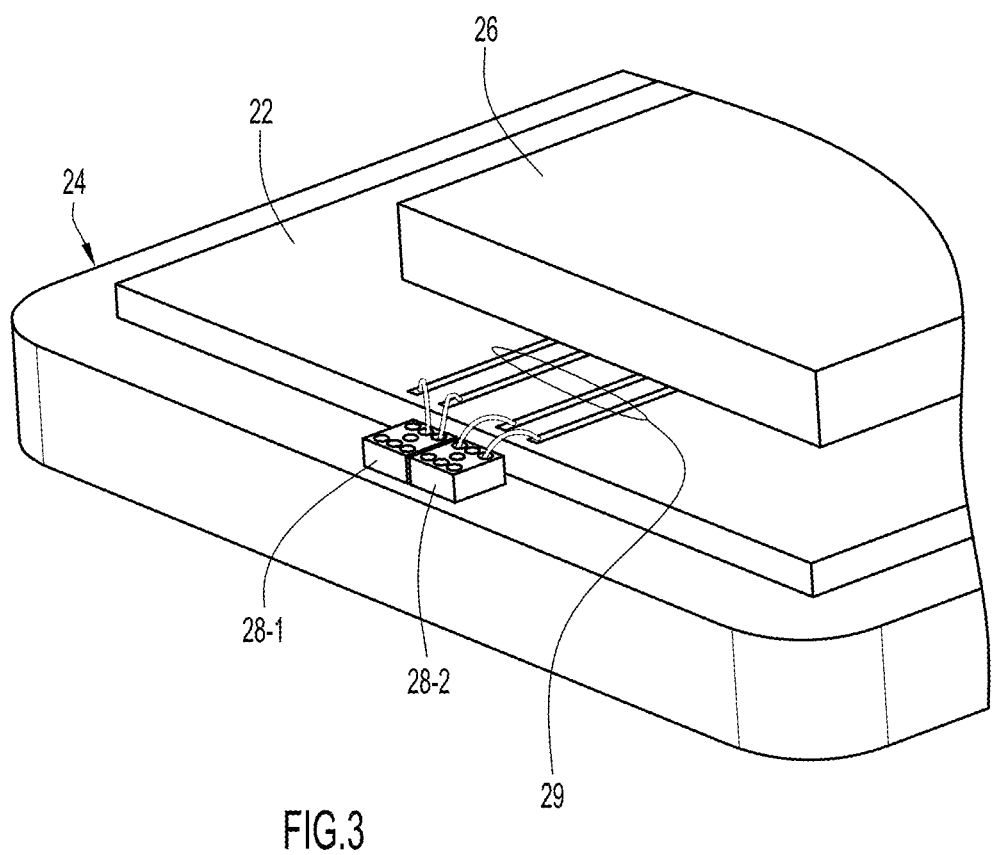
FIG. 3 is a perspective view showing a portion of an electrical subassembly of the optical receiver assembly package, according to an example embodiment.

Reference is now made to FIG. 3. FIG. 3 shows further details concerning the electrical IC and photodetector arrangement of the electrical subassembly 20. The electrical IC 26 may be flip-chip mounted with solder or other mediums (anisotropic conductive film or paste, stud bumping) onto the circuit board 22. The circuit board 22 may be a multi-layered flex circuit board. The circuit board 22 is initially mounted onto the supporting plate 24 to provide a stable mounting platform for both electrical and optical components. Flip-chip mounting is an efficient, low-cost and reliable bonding method, particularly for high density devices, as compared to wire bonding. The use of laminated multi layered flex board 22 is more cost-effective as compared to inorganic substrates like ceramic or silicon.

The supporting plate or board 24 also serves as mount for the photodetectors (e.g., photodiodes), which are shown as two photodetectors 28-1 and 28-2, each one for a corresponding wavelength obtained from the received light beam. The photodetectors 28-1 and 28-1 may be placed close to the edge of the circuit board 22 but on the supporting plate 24. This allows a shortest possible electrical connection for the wire bonds 29. The thickness of the circuit board 22 is very close to the height/thickness of the photodetectors 28-1 and 28-2, which levels the photodetectors 28-1 and 28-2 to the top surface of the circuit board 22, helping to reduce wire bond length. This example shows two photodetectors 28-1 and 28-2 for a 100 GHz received optical signal, but there may be just one photodetector for a 40 GHz received optical signal (single wavelength) or more than two for received optical signal of 100 GHz or more. The photodetectors could also sit on an additional sub-mount (not shown) to match coefficients of thermal expansion (CTE), or electrically de-coupled from the plate, and only then mounted to the plate. Alternatively, the photodetectors are placed directly onto the circuit board within an optional small pocket in the circuit board.

Figure 4:
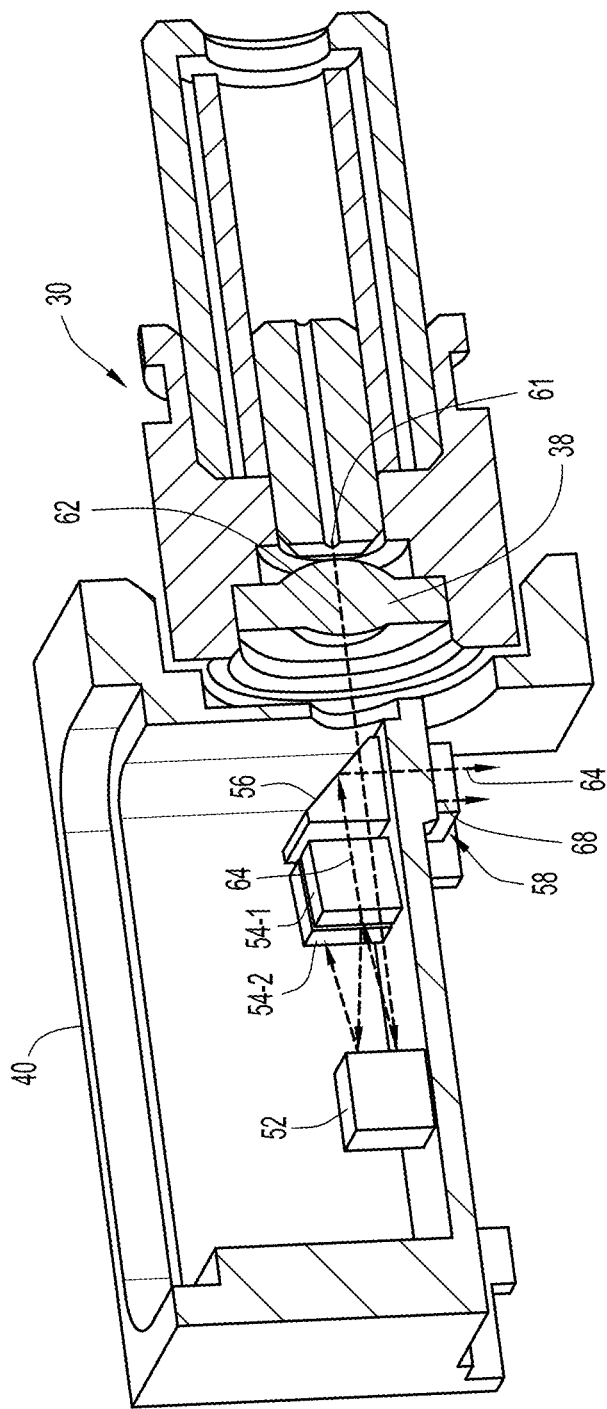
FIG. 4 is an internal perspective view, similar to FIG. 1, and illustrating the path of light beams during operation of the optical receiver assembly package, according to an example embodiment.
Figure 5:
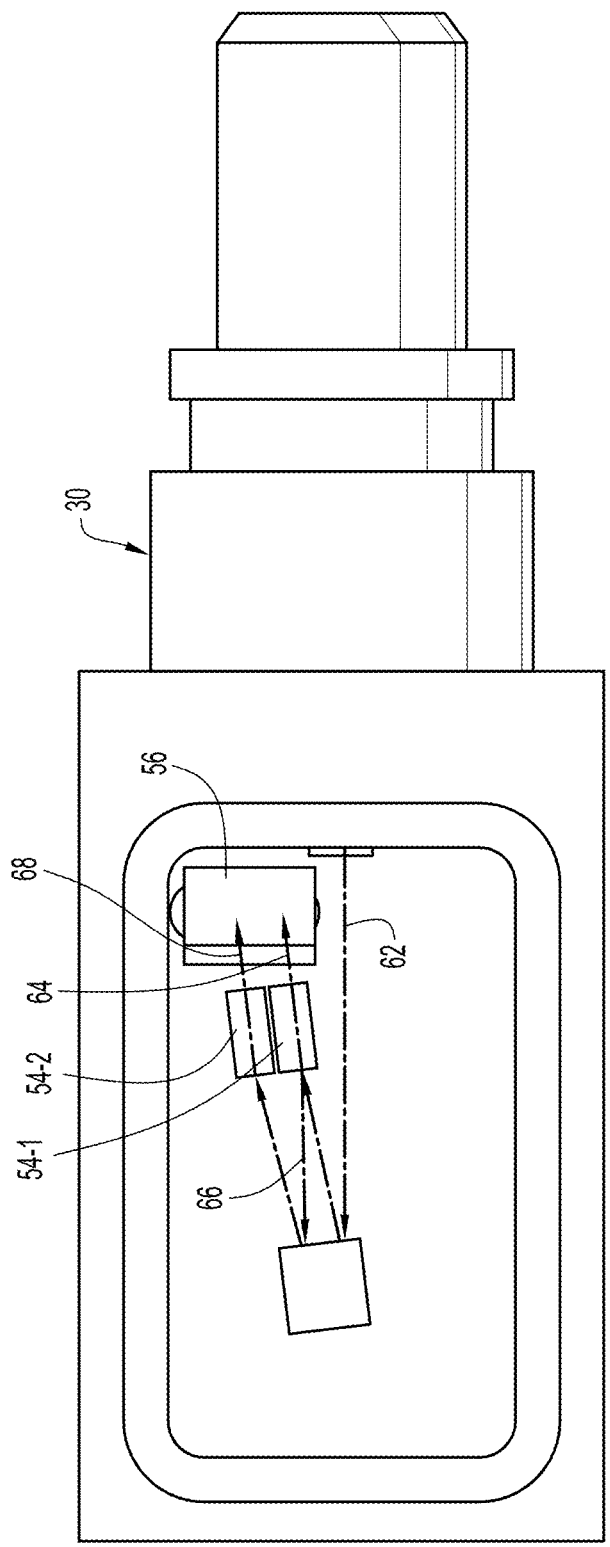
FIG. 5 is a top view of the optical receiver assembly package of FIG. 1, and showing the paths of light beams during operation of the optical assembly package, according to an example embodiment.

Reference is now made to FIGS. 4 and 5 for a description of the operation of the optical assembly package 10. Incoming (received) light shown at reference numeral 61 enters the optical assembly package 10 via fiber stub 32. The collimating lens 38 sitting close to the fiber stub 32 produces a collimated (or close to collimated) beam 62 that enters the housing 40 via the opening 45. The light beam 62 can contain several different wavelengths. FIGS. 4 and 5 show an example in which there are two wavelengths, such as for a 100 GHz received optical signal. The mirror 52 reflects incoming beam 62 back in the general direction from which it came, to the first thin film filter 54-1 which allows light beam at only a first specific wavelength to pass as shown at 64. The prism mirror 56 turns the light beam 64 by 90 degrees where it hits the condensing lens array 58. The light that is not allowed to pass through thin film filter 54-1 is reflected back to the mirror 52 as shown at reference numeral 66. This light beam 66 is then reflected by mirror 52 to the second thin film filter 54-2 which allows only a second specific wavelength to pass, as shown at reference numeral 68. The light beam 68 (at the second specific wavelength) is redirected by prism mirror 56 to condensing lens array 58.

As best shown in FIG. 4, the prism mirror 56 is positioned off-center from the incoming beam 60 to prevent interference between incoming light beam 62 and demultiplexed light beams 64 and 68. The photodetectors 28 are positioned underneath the condensing lens array 58 so that the light beams 64 and 68 are focused to hit the active area of a corresponding photodetector.

The positioning of the demultiplexing optical elements unit within the package 10 contributes to its compact and stable design. The optical elements 50 are positioned on one level (in Layer 3) and underneath at a lower level (in Layer 1) the circuit board 22 with the IC 26 and photodetectors 26 are positioned. This approach keeps the overall length of package to a minimum.

Figure 6:
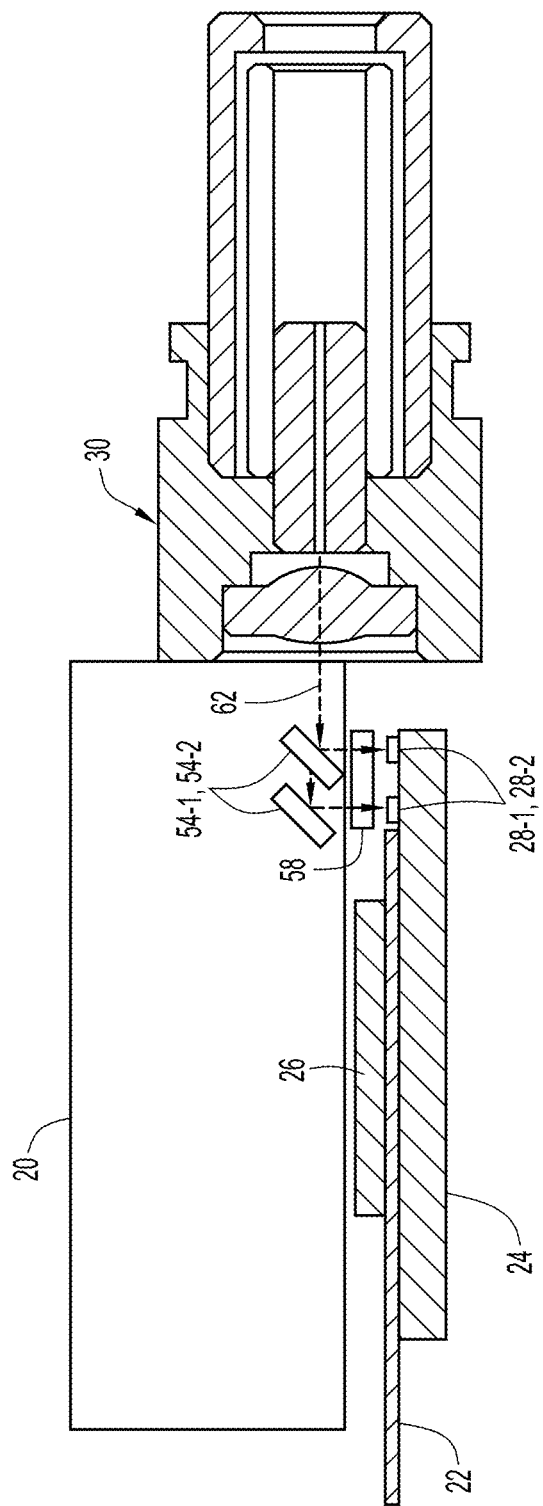
FIG. 6 is a side partial section view of an optical receiver assembly package featuring a wavelength demultiplexing arrangement according to another example embodiment.

To further minimize the number of components and cost, an arrangement is provided as shown in FIG. 6. Thin film filters 54-1, 54-2, are positioned at a 45 degree angle relative to the collimated beam 62 to directly deflect the corresponding wavelengths of light (64 and 68) to photodetectors 28-1 and 28-2, respectively. This eliminates the need for additional mirror components and alignment thereof.

Figure 7A:
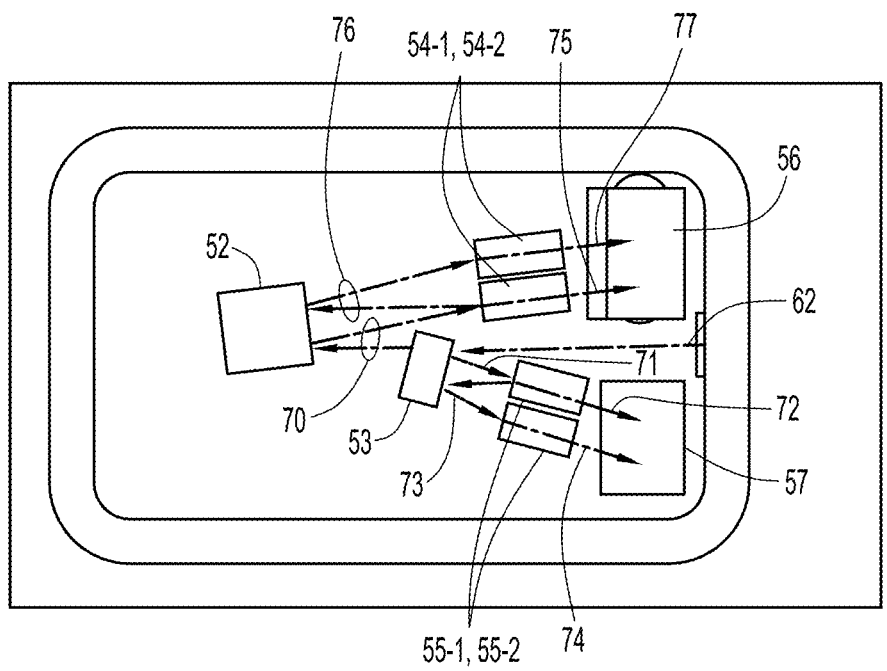
FIG. 7A is a top view of an optical receiver assembly package according to another example embodiment, and featuring a wavelength demultiplexing arrangement to obtain four wavelengths from a received optical signal.

Turning now to FIG. 7A, a variation of the optical assembly package is shown at reference numeral 10'. In this embodiment, the optical assembly package 10' can receive an incoming optical light beam and extract four separate wavelengths from the light beam, without increasing the size of the package. In this embodiment, in addition to the optical elements referred to in connection with FIGS. 4 and 5, there is a thin film filter 53 (bandpass filter), another pair of thin film filters 55-1 and 55-2 and another prism mirror 57. The incoming collimated light beam 62 hits the thin film filter 53. Filter 53 reflects light in a wavelength range that includes first and second wavelengths, and allows light to pass in a wavelength range that includes third and fourth wavelengths. The light beam that passes through filter 53 is shown at reference numeral 70. The light beam 71 that is reflected by filter 53 hits thin film filter 55-1. Filter 55-1 allows light to pass at a first wavelength and reflects light not at the first wavelength, which is shown at reference numeral 72. The light beam reflected by filter 55-1 is shown at reference numeral 73, and that light beam is reflected by filter 53 and hits filter 55-2. Filter 55-2 lets light at a second wavelength pass, and this light beam is shown at reference numeral 74.

In the other optical path, mirror 52 reflects light beam 70 to hit thin film filter 54-1. Filter 54-1 lets light at a third wavelength pass, and this light beam is shown at reference numeral 75. Light not at the third wavelength is reflected by thin film filter 54-1 back to mirror 52 and this is shown at reference numeral 76. Light beam 76 hits thin film filter 54-2, which allows light to pass at a fourth wavelength, shown at reference numeral 77.

Similar to the embodiment shown in FIGS. 4 and 5, the prism mirrors 56 and 57 are both positioned offset from the incoming collimated light beam 62, but on opposite sides of the incoming light beam 62. This prevents interference between the reflected wavelengths and the incoming collimated light beam 62.

Figure 7B:
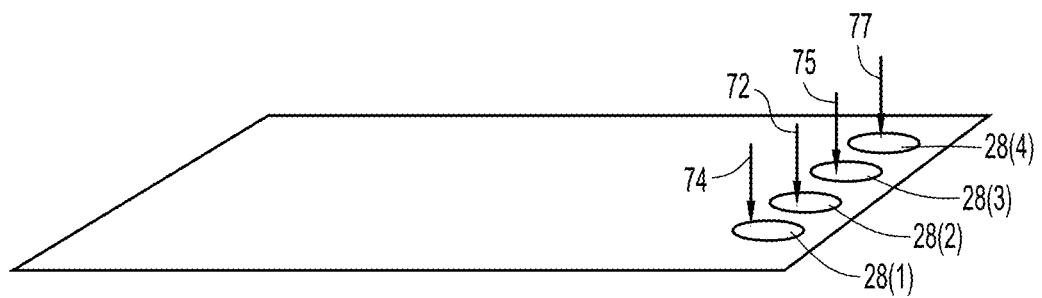
FIG. 7B is a partial perspective view of an electrical subassembly configured to receive light beams at four wavelengths, according to an example embodiment as depicted in FIG. 7A.

FIG. 7B shows a portion of the electrical subassembly 20 having four photodetectors (e.g., photodiodes) 28-1, 28-2, 28-3 and 28-4 to receive the light beams 72, 74, 75 and 77 at the four wavelengths for the optical assembly package 10' of FIG. 7A.

Figure 8A:
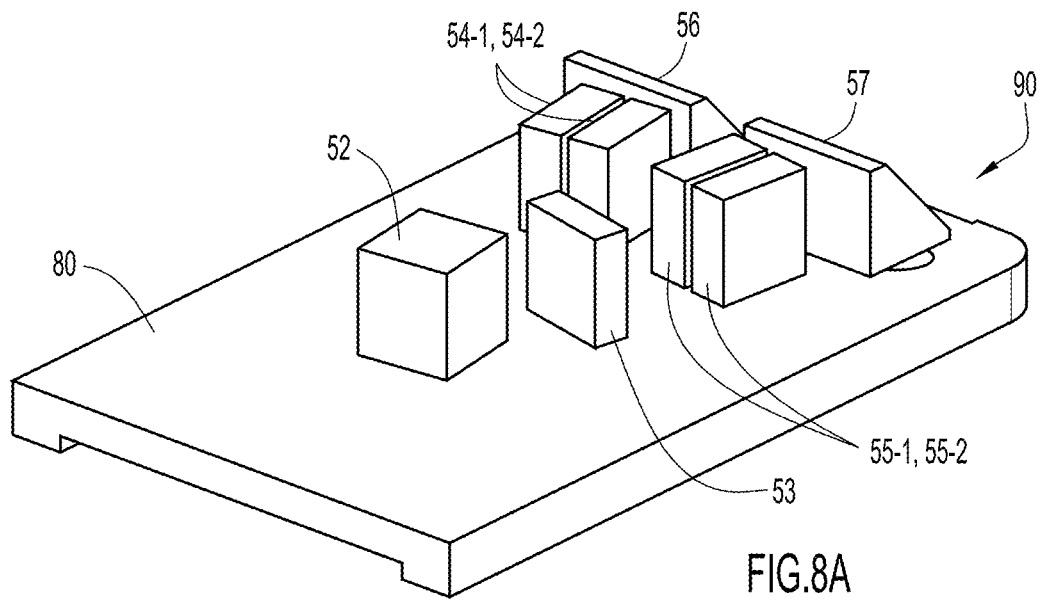
FIG. 8A is a top perspective view of an optical receiver subassembly, according to another example embodiment.
Figure 8B:
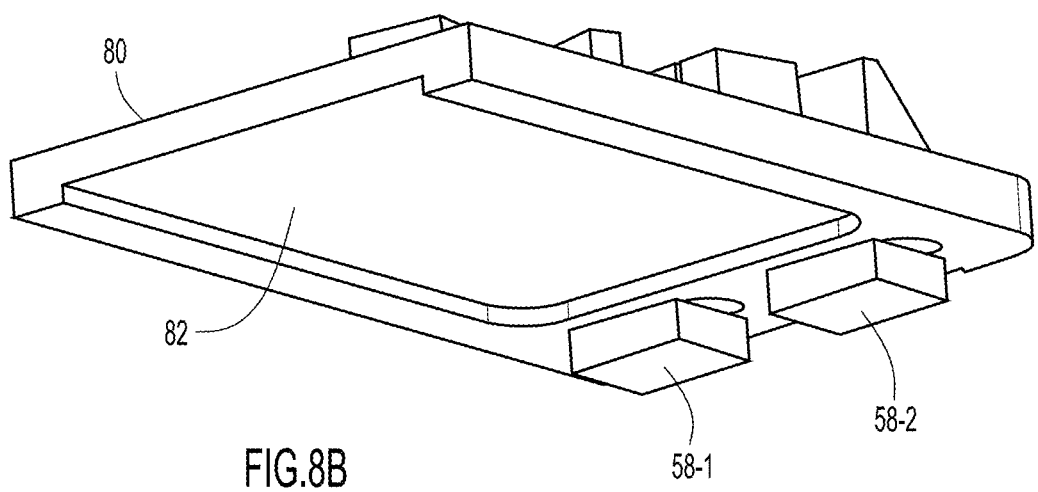
FIG. 8B is a bottom perspective view of an optical receiver subassembly shown in FIG. 8A, according to an example embodiment.

Reference is now made to FIGS. 8A and 8B. These figures show the Optical Layer 3 in a preassembled package or subassembly, and of the form in which four wavelengths are supported, as shown in FIGS. 7A and 7B. FIGS. 8A and 8B show the optical demultiplexing and routing elements preassembled onto a carrier or support plate 80. That is, the mirror 52, thin film filter 53, filters 54-1, 54-1 and 55-1, 55-2, and prism mirrors 56 and 57 are mounted onto support plate 80. In addition, the condensing lens arrays 58-1 and 58-2 are attached to the bottom of the support plate 80 as shown, where light is ultimately directed downward through openings in the support plate 80. As best shown in FIG. 8B, the support plate 80 includes a recessed portion 82. This recessed portion 82 is sized and shaped to accommodate and align the electrical subassembly 20 (Layer 1), as described hereinafter. The Optical Layer 3 subassembly is shown generally at reference numeral 90.

Figure 9A:
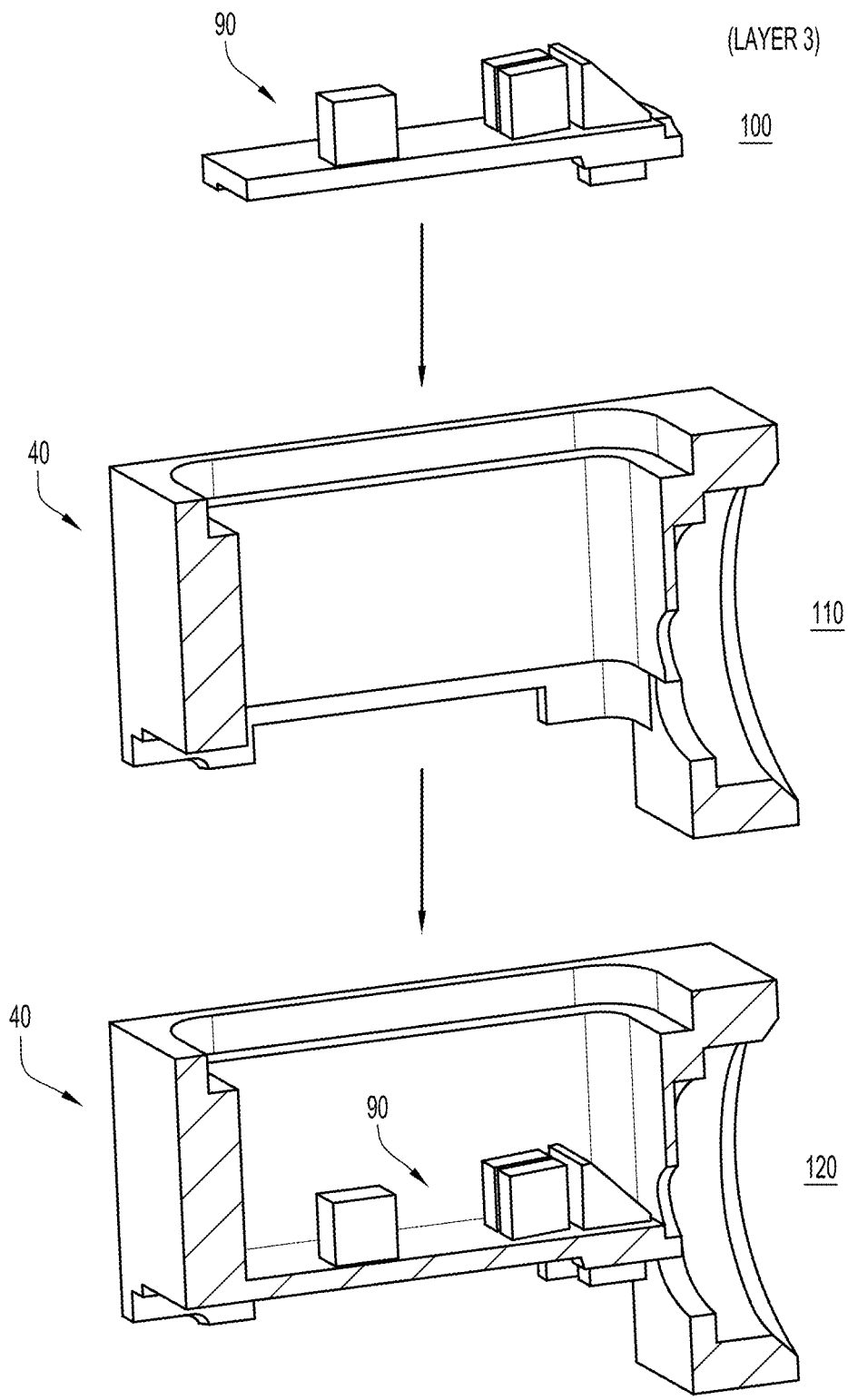
FIGS. 9A and 9B illustrate a process for assembling the optical receiver assembly package, according to an example embodiment.
Figure 9B:
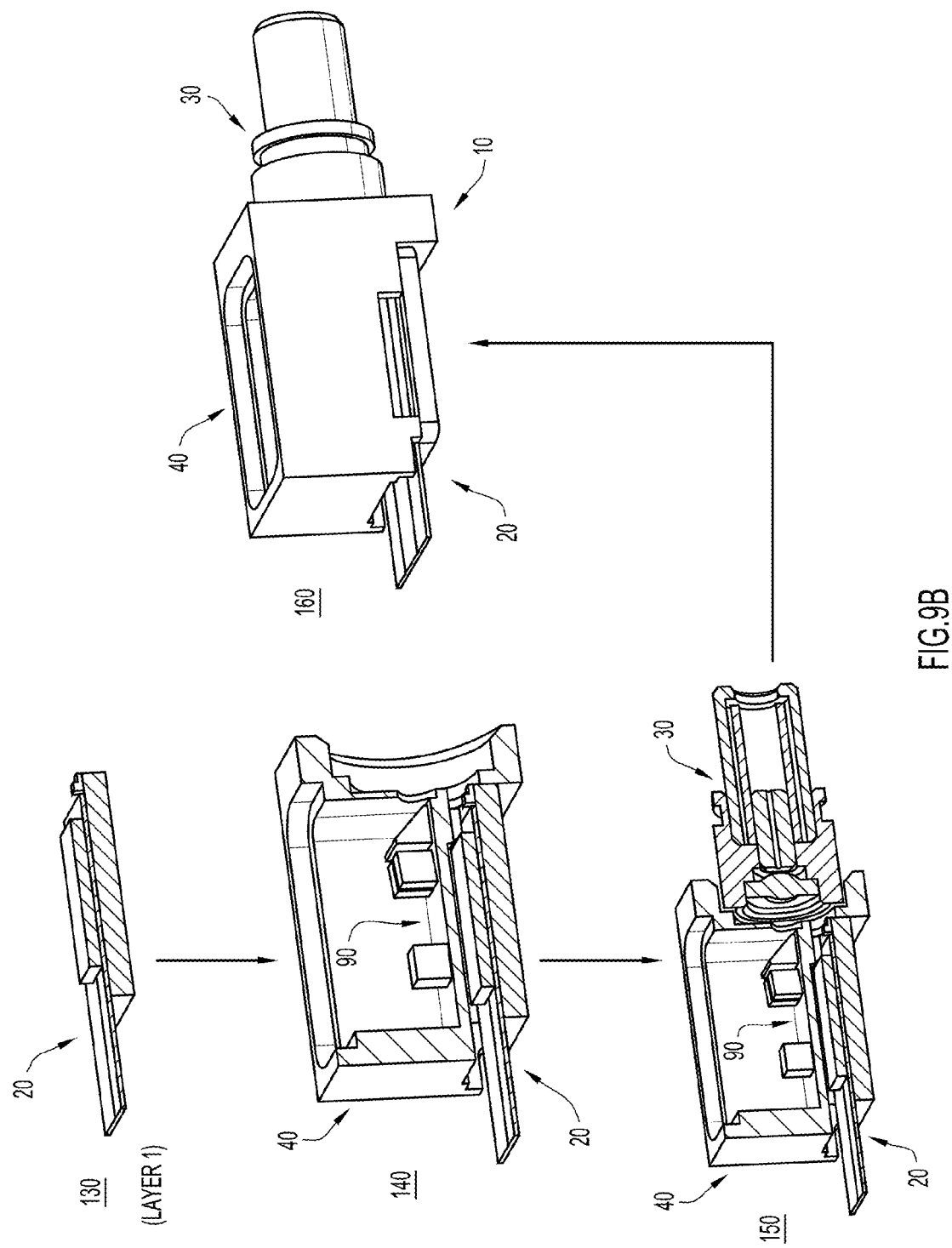

Turning now to FIGS. 9A and 9B, an example process for assembling the optical assembly package 10 is now described. At step 100, the Optical Layer 3 subassembly 90 is assembled by placing each of the optical demultiplexing and routing elements on the support plate 80. Next, at 110, the housing 40 is obtained and at 120, the Optical Layer 3 subassembly 90 is joined with the housing 40. Turning to FIG. 9B, at 130, the Layer 1 electrical subassembly 20 is assembled. At 140, the Layer 1 electrical subassembly 20 is mounted into the housing beneath the support plate 80 of the Optical Layer 3 subassembly 90. In so doing, the Layer electrical subassembly 20 is joined to and positioned beneath the Optical Layer 3 subassembly 90. At 150, the receptacle subassembly 30 is with collimating lens is aligned to and inserted into the housing 40 and joined to the rest of the assembly 10. It should be understood that a similar assembly flow may be followed for the version of the package 10 in which the optical elements are mounted in the housing (without the use of the support carrier/plate 80).

Figure 10:
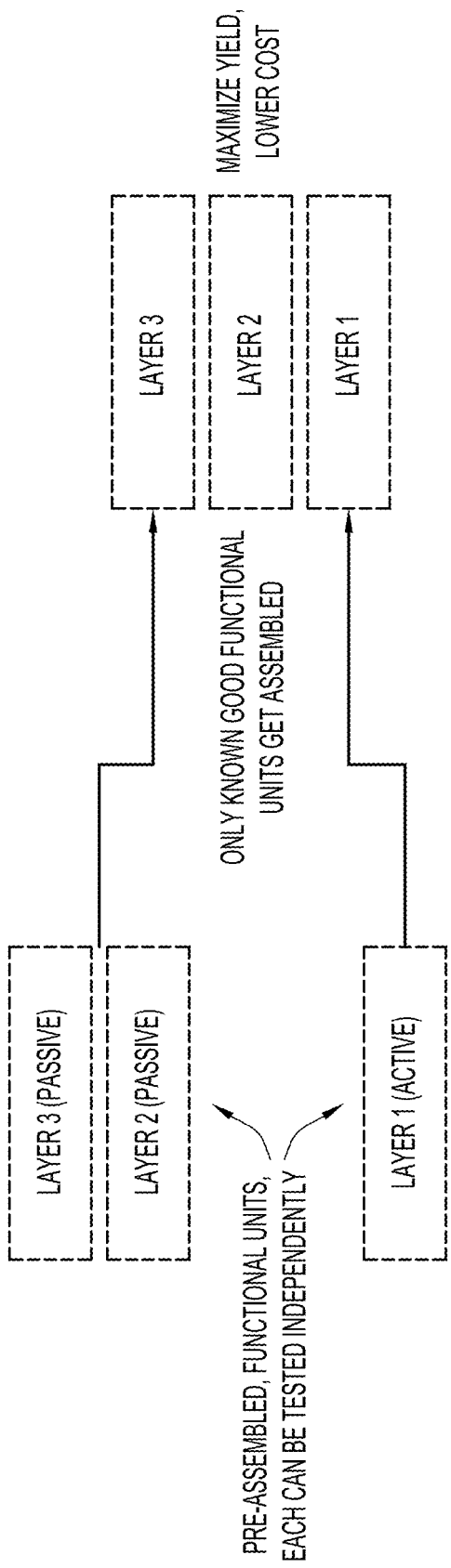
FIG. 10 is a diagram generally depicting a build and assembly process of an optical receiver assembly package, according to an example embodiment.

Reference is now made to FIG. 10. Assembly of the package described herein can be broken down into functional subassemblies which can be tested independently to maximize yield for final assembly. Yield is therefore not cumulative from first to last part but only for subset of parts. Expensive IC and expensive optical alignment are in separate subassemblies to balance the value of each subassembly and break cumulative yield of subassemblies into even parts. As shown in FIG. 10, each of the three functional layers can be fabricated as preassembled functional units, and each can be tested separately. Only good functional units get assembled into a package, which maximizes yield and lowers cost. Individual functional layers and final assembly can be re-worked to further improved yield. Layer 3 is mechanically stable to achieve desired alignment between the optical elements.

The three-dimensional stacking of the three functional layers combined with placing the thin film filters and prism mirror(s) off-center enables a high degree of compactness and minimal footprint. It also makes use of unused vertical space.

Thus, to summarize FIGS. 9A, 9B and 10, a method of assembling an optical receiver apparatus, comprising: obtaining a first functional layer of an optical apparatus, the first functional layer including an electrical subassembly including one or more photodetectors; obtaining a second functional layer of the optical apparatus, the second functional layer including an optical-feed through on a wall of a housing that is configured to contain optical routing and wavelength demultiplexing elements; obtaining a third functional layer of the optical apparatus, the third functional layer including the optical routing and wavelength demultiplexing elements; and assembling the optical apparatus such that the second functional layer is on top of the first functional layer and the third functional layer overlies the second functional layer. Obtaining the third functional layer may include obtaining an optical subassembly that includes a support plate to which optical demultiplexing and routing elements are mounted. Assembling the optical apparatus may include: mounting the optical subassembly within the housing; mounting the electrical subassembly within the housing beneath the optical subassembly such that the electrical subassembly is aligned in predetermined relationship with the optical feed-through of the wall of the housing; and attaching a receptacle subassembly to the housing such that a lens of the receptacle subassembly is aligned in a predetermined relationship with the optical demultiplexing and routing elements in the optical subassembly. The individual functional layers, in particular the electrical subassembly and the optical subassembly, may be built and tested before the optical apparatus is assembled.

The overall length of an optical receiver assembly package can be reduced using the design presented herein. For example, and not by way of limitation, from the optical plane on the fiber stub to the mechanical back end, the length reduction for the described package can be from approximately 19.5 mm to 13.2 mm. In general, the length reduction is based on a sum of the length of the IC, the protrusion of the flex circuit board (1-2 mm) and half a length of a photodetector. A width of 6 mm allows the package to fit into a front portion of a QSFP/SFP transceiver and allows a transmit assembly of a similar width to be placed right next to it.

Functional Layer 1 can accommodate a relatively long IC with functionality in addition to analog signal processing functions. Functional Layer 3 allows for additional optical functionality beyond two wavelength demultiplexing (e.g., four wavelength demultiplexing or more, as well as various controls) to support optical signals at and above 100 Gbps. More complex optics can be preassembled outside of the package on an additional carrier as described above.

As described above, the assembly package may be non-hermetic. It uses a minimum amount of optical components, and has a compact, small footprint with high functionality. The compact, stacked arrangement of the optical demultiplexing elements reduces overall length of package, which is useful for certain transceiver formats.

Due to increased demand for more compact optical transceiver designs, the available space for all necessary elements is limited within transceiver package. The staggered/layered arrangement of electrical and optical elements allows for a compact and stable package design without increasing the cost of packaging.

In summary, an optical assembly apparatus is provided comprising: a housing configured to contain optical routing and wavelength demultiplexing elements, the housing having an opening at one end and a bottom wall having an optical feed-through; a receptacle subassembly configured to connect to an optical fiber and to fit into the opening of the housing; and an electrical subassembly comprising one or more photodetectors and an integrated circuit; wherein the electrical subassembly defines a first functional layer of the apparatus, the optical feed-through defines a second functional layer of the apparatus, and the optical routing and wavelength demultiplexing elements defines a third functional layer of the apparatus, and the second functional layer being arranged between the first functional layer and the third functional layer.

Similarly, an apparatus is provided comprising: a receptacle subassembly configured to receive an end of an optical fiber; a housing having an opening at one end configured to receive the receptacle assembly, the housing including a bottom wall; optical routing and wavelength demultiplexing elements mounted to the bottom wall of the housing; and an electrical subassembly comprising a support plate, a circuit board mounted on the support plate, an integrated circuit mounted to the circuit board, and a plurality of photodetectors mounted to the support plate proximate an edge of the circuit board; wherein the electrical subassembly is positioned in a stacked arrangement beneath the housing.

The above description is intended by way of example only. Various modifications and structural changes may be made therein without departing from the scope of the concepts described herein and within the scope and range of equivalents of the claims.

What is claimed is:

1. An optical assembly apparatus comprising:
   a housing having an opening at one end and a wall having an optical feed-through;
   a receptacle subassembly configured to connect to an optical fiber, fit into the opening of the housing, and direct a light beam derived from a received optical signal within the optical fiber along an initial optical path through the opening in the housing;
   optical routing and wavelength demultiplexing elements mounted to an inner side of the wall of the housing and including a mirror and one or more additional optical elements off-path from the initial optical path of the light beam; and
   an electrical subassembly comprising one or more photodetectors and an integrated circuit, wherein the one or more photodetectors are optically aligned with the optical routing and wavelength demultiplexing elements;
   wherein the electrical subassembly defines a first functional layer of the apparatus, the optical feed-through defines a second functional layer of the apparatus, and the optical routing and wavelength demultiplexing elements define a third functional layer of the apparatus and the second functional layer being arranged between the first functional layer and the third functional layer.

2. The apparatus of claim 1, wherein the first functional layer, the second functional layer and the third functional layer are disposed in a stacked arrangement such that the electrical subassembly is on a first end of the stack arrangement, the third functional layer is on a second end of the stack arrangement opposite to the first end, and the second functional layer is disposed between the first functional layer and the third functional layer.

3. The apparatus of claim 1, wherein the optical routing and wavelength demultiplexing elements of the third functional layer are longitudinally aligned with the integrated circuit and the one or more photodetectors in the electrical subassembly of the first functional layer.

4. The apparatus of claim 1, further comprising a collimating lens within the receptacle subassembly configured to direct the light beam along the initial optical path through the opening in the housing.

5. The apparatus of claim 1, wherein the mirror is positioned in the initial optical path to reflect the light beam back in an opposite direction within the housing but off-path from the initial optical path of the light beam; and the one or more additional optical elements comprise:
   at least first and second filters; and
   a first prism mirror wherein the first and second filters and the first prism mirror are positioned off-path from the initial optical path of the light beam, and wherein the first filter is configured to pass light at a first wavelength to the first prism mirror and the second filter is configured to pass light at a second wavelength to the first prism mirror.

6. The apparatus of claim 5, wherein the one or more photodetectors includes a first photodetector and a second photodetector, and the second functional layer further comprises a condensing lens array positioned in the optical feed-through of the housing to direct light beams received from the first prism mirror at the first wavelength to the first photodetector and light beams received from the first prism mirror at the second wavelength to the second photodetector.

7. The apparatus of claim 5, wherein the optical routing and wavelength demultiplexing elements further comprise:
   a third filter, a fourth filter, and a second prism mirror positioned off-path from the initial optical path of the light beam and on an opposite side of the initial optical path from the first filter, the second filter, and the first prism mirror, wherein the third filter is configured to pass light at a third wavelength and the fourth filter is configured to pass light at a fourth wavelength; and
   a fifth filter positioned in the initial optical path of the light beam and configured to reflect light in a wavelength range that includes the first wavelength and the second wavelength towards the first filter and the second filter, and to pass light in a wavelength range that includes the third wavelength and the fourth wavelength to the mirror for directing to the third filter and the fourth filter.

8. The apparatus of claim 7, wherein the electrical subassembly includes four photodetectors, each configured to receive a corresponding a light beam at a corresponding one of the first, second, third and fourth wavelengths.

9. An apparatus comprising:
   a receptacle subassembly configured to receive an end of an optical fiber;
   a housing having an opening at one end configured to receive the receptacle assembly, the housing including a wall with an optical feed-through;

optical routing and wavelength demultiplexing elements mounted to an inner side of the wall of the housing; and
an electrical subassembly disposed adjacent an outer side of the wall, the electrical subassembly comprising a support plate, a circuit board, an integrated circuit, and a plurality of photodetectors disposed in a stacked arrangement, such that the circuit board is mounted on the support plate, the integrated circuit is mounted on the circuit board, the plurality of photodetectors are mounted on a surface of the support plate proximate an edge of the circuit board and facing the integrated circuit, and the integrated circuit is disposed adjacent the outer side of the wall, such that the plurality of photodetectors are configured to receive light from the optical routing and wavelength demultiplexing elements;
wherein the electrical subassembly is positioned adjacent an outer side of the housing.

10. The apparatus of claim 9, wherein the receptacle assembly includes a collimating lens configured to direct a light beam derived from a received optical signal within the optical fiber on an optical path through the opening in the housing.

11. The apparatus of claim 9, wherein the optical routing and wavelength demultiplexing elements comprise:
a mirror; and
one or more additional optical elements off-path from an initial optical path of a light beam received from the optical fiber.

12. The apparatus of claim 9, wherein the optical routing and wavelength demultiplexing elements within the housing include:
a mirror positioned in an initial optical path of a light beam to reflect the light beam back in an opposite direction within the housing but off-path from the initial optical path of the light beam;
at least a first filter and a second filter; and
a first prism mirror;
wherein the first filter, the second filter, and the first prism mirror are positioned off-path from the initial optical path of the light beam, and wherein the first filter is configured to pass light at a first wavelength to the first prism mirror and the second filter is configured to pass light at a second wavelength to the first prism mirror.

13. The apparatus of claim 12, wherein the plurality of photodetectors includes a first photodetector and a second photodetector, and the optical feed-through further comprises a condensing lens to direct light beams received from the first prism mirror at the first wavelength to the first photodetector and light beams received from the first prism mirror at the second wavelength to the second photodetector.

14. The apparatus of claim 12, wherein the optical routing and wavelength demultiplexing elements further comprise:
a third filter, a fourth filter, and a second prism mirror positioned off-path from the initial optical path of the light beam and on an opposite side of the initial optical path from the first filter, the second filter, and first prism mirror, wherein the third filter is configured to pass light at a third wavelength and the fourth filter is configured to pass light at a fourth wavelength; and
a fifth filter positioned in the initial optical path of the light beam and configured to reflect light in a wavelength range that includes the first wavelength and the second wavelength towards the first filter and the second filter, and to pass light in a wavelength range that includes the third wavelength and the fourth wavelength to the mirror for directing to the third filter and the fourth filter.

15. The apparatus of claim 14, wherein the electrical subassembly includes four photodetectors, each configured to receive a corresponding a light beam at a corresponding one of the first, second, third and fourth wavelengths.

16. The apparatus of claim 9, wherein the optical routing and wavelength demultiplexing elements within the housing include:
a first filter and a second filter positioned in an optical path of a light beam derived from a received optical signal within the optical fiber, wherein the first filter and the second filter are oriented at an angle with respect to the optical path, wherein the first filter is configured to reflect light at a first wavelength through the optical feed-through and the second filter is configured to reflect light at a second wavelength through the feed-through.

17. The apparatus of claim 16, wherein the plurality of photodetectors includes a first photodetector and a second photodetector, and the optical feed-through further comprises a condensing lens to direct light beams received from the first and second filters at the first wavelength and the second wavelength to the first photodetector and the second photodetector, respectively.

18. A method comprising:
obtaining a first functional layer of an optical apparatus, the first functional layer including an electrical subassembly that includes one or more photodetectors;
obtaining a second functional layer of the optical apparatus, the second functional layer including a first side, a second side opposite the first side, and an optical feed-through on a wall of a housing that is configured to support optical routing and wavelength demultiplexing elements;
obtaining a third functional layer of the optical apparatus including the optical routing and wavelength demultiplexing elements, which include a mirror and one or more additional optical elements off-path from an initial optical path of light beams received in the housing; and
assembling the optical apparatus such that the first functional layer is adjacent to the first side of the second functional layer and the third functional layer is adjacent to the second side of the second functional layer.

19. The method of claim 18, wherein obtaining the third functional layer comprises obtaining an optical subassembly that includes a support plate to which the optical routing and wavelength demultiplexing elements are mounted, and wherein assembling comprises:
mounting the optical subassembly within the housing;
mounting the electrical subassembly within the housing such that the electrical subassembly is longitudinally aligned with the optical feed-through of the wall of the housing; and
attaching a receptacle subassembly to the housing such that a lens of the receptacle subassembly is optically aligned with the optical routing and wavelength demultiplexing elements in the optical subassembly.

20. The method of claim 18, wherein obtaining the third functional layer comprises obtaining an optical subassembly that includes a support plate to which the optical routing and wavelength demultiplexing elements are mounted, and the method further comprises:
building the electrical subassembly and optical subassembly before assembling the optical apparatus; and
testing each of the electrical subassembly and the optical subassembly to ensure proper functionality prior to assembling the optical apparatus.

* * * * *